United States Patent
Wang et al.

(10) Patent No.: US 7,646,968 B1
(45) Date of Patent: Jan. 12, 2010

(54) END-USER CONFIGURABLE DIGITAL VERSATILE DISK MENUS AND METHODS FOR GENERATING THE SAME

(75) Inventors: Samuel C. Wang, Milpitas, CA (US); Matthieu C. A. Jeanson, Sunnyvale, CA (US); Jeremy V. Alves, Mountain View, CA (US)

(73) Assignee: Magnum Semiconductor, Inc., Fremont, CA (US)

( * ) Notice: Subject to any disclaimer, the term of this patent is extended or adjusted under 35 U.S.C. 154(b) by 896 days.

(21) Appl. No.: 10/706,014

(22) Filed: Nov. 12, 2003

(51) Int. Cl.
*H04N 5/00* (2006.01)

(52) U.S. Cl. ............................. 386/125; 386/46; 386/95

(58) Field of Classification Search ................. 386/125, 386/46, 95
See application file for complete search history.

(56) References Cited

U.S. PATENT DOCUMENTS

| 5,570,126 | A | * | 10/1996 | Blahut et al. | .................. | 725/93 |
| 6,553,180 | B1 | * | 4/2003 | Kikuchi et al. | ................. | 386/95 |
| 6,859,608 | B1 | * | 2/2005 | Nishikawa et al. | ............ | 386/46 |
| 7,046,260 | B2 | * | 5/2006 | Frimout et al. | .............. | 345/660 |
| 2003/0147629 | A1 | * | 8/2003 | Kikuchi et al. | ................. | 386/69 |
| 2003/0198463 | A1 | * | 10/2003 | Temple et al. | ............... | 386/125 |

OTHER PUBLICATIONS

Cirrus Logic, CS98000 DVD On-A-Chip Preliminary Product Information, Nov. 2001, Cirrus Logic, Inc., Austin, Texas.
Cirrus Logic, DVD Recorders Platform Overview, 2003, Cirrus Logic, Inc., Austin, Texase.

* cited by examiner

*Primary Examiner*—Thai Tran
*Assistant Examiner*—Girumsew Wendmagegn
(74) *Attorney, Agent, or Firm*—Thompson & Knight LLP; James J. Murphy

(57) ABSTRACT

An embedded digital versatile disk recording system operable to selectively record a menu with a user generated background image on a digital versatile disk.

12 Claims, 5 Drawing Sheets

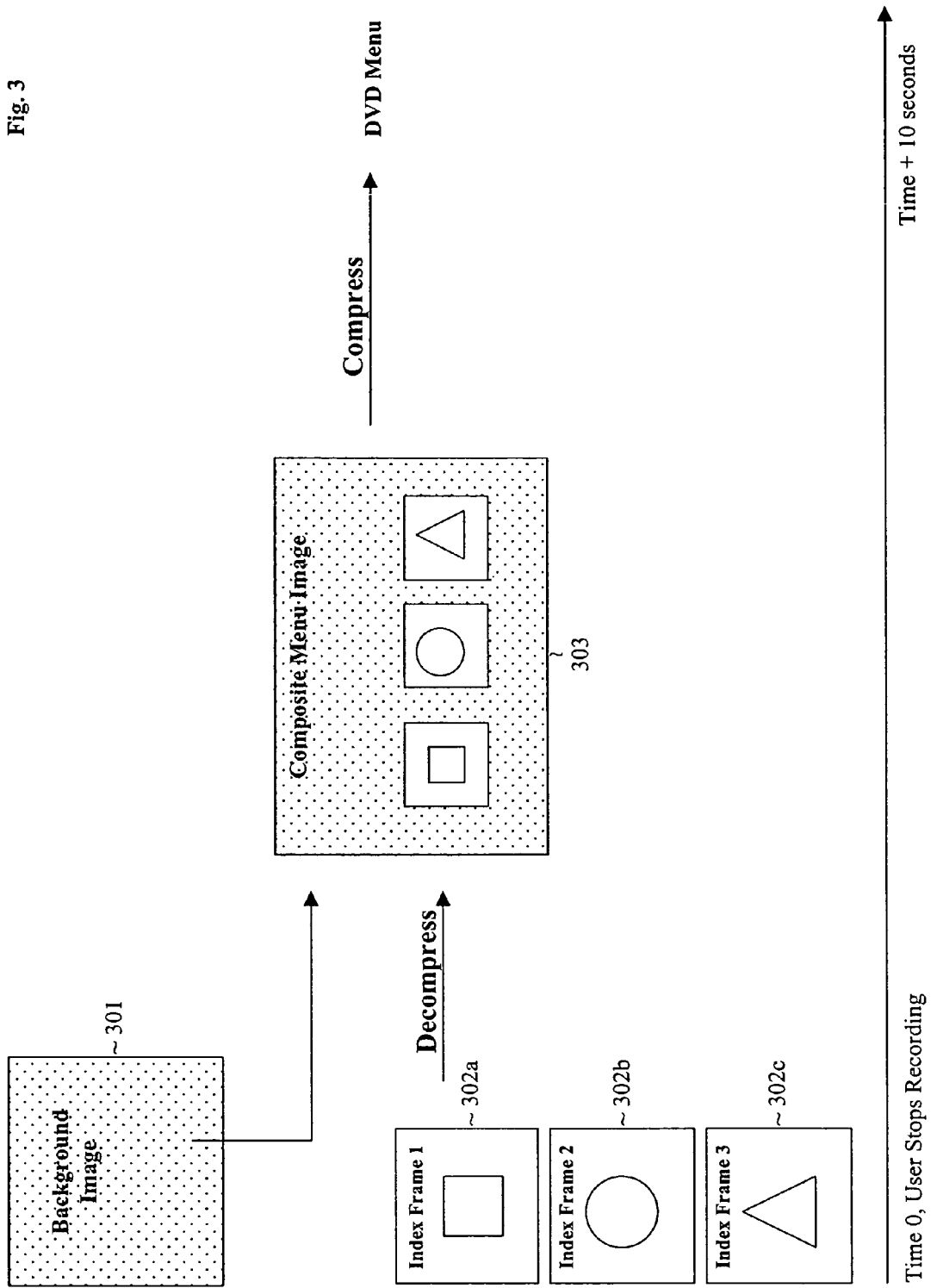

END-USER CONFIGURABLE DIGITAL VERSATILE DISK MENUS AND METHODS FOR GENERATING THE SAME

FIELD OF INVENTION

The present invention relates in general to home entertainment systems and in particular to an end-user configurable digital versatile disk menus and methods for generating the same.

BACKGROUND OF INVENTION

The digital versatile disk (DVD) has become the primary media for recording and distributing commercially produced digital audio-video entertainment, most notably movies. The DVD has a number of significant advantages over older technologies, such as video tapes. For example, DVDs are generally more compact and easier to handle, produce higher quality audio and video on playback, and provide the user more control options, including the capability of quickly jumping to selected scenes or chapters within the materials recorded on the disk.

Most commercially produced DVDs include a menu that appears on the video screen automatically upon insertion of the DVD into a DVD player. The menu typically allows the user, through an on-screen cursor, to select between various control options. For example, the menu often allows the user to select between a primary presentation or title, such as a movie, and a secondary presentation or title, such as background material related to the primary title. The menu also typically allows the user to switch to a chapter list which lists, in text form, various points in the selected title (e.g. scenes or "chapters") to which the user can directly jump under cursor control.

Menus in commercially produced DVDs usually have a static background, such as a still picture taken from the video portion of a given title or a graphic design. Some commercial DVDs utilize animated menu backgrounds, including audio and visual effects. In either case, commercial DVD producers normally have specialized hardware and software that will allow a menu with a particular background to be generated and then reproduced on each manufactured DVD.

The advent of one-time writable and re-writable DVDs (DVD-R and DVD-R/W) has allowed for non-commercial and small-scale commercial authoring of DVDs. The input data source can be a television receiver, camcorder, another DVD or similar audio-video data source, or a personal computer. Thus, for example, a user can record television shows for later viewing or store camcorder segments in a compact, organized, and easily transportable medium.

Most DVD-R and DVD-R/W systems allow for multiple titles, such as movies, television programs, or camcorder segments, to be recorded on a single medium, as well as for each title to be partitioned into chapters. A menu of titles and chapters is then generated by the user for navigation. However, menu generation in non-commercial and other small-scale applications is still subject to significant limitations not found in more sophisticated commercial systems. Specifically, menus in small-scale applications are typically similar to the chapter lists found in commercial DVDs, with text and a limited selection of backgrounds. In particular, the options available for the menu background are typically limited to only a few static backgrounds, such as company logos or other graphics, made available by the particular manufacturer of the DVD playback-recording system.

Hence, the ability of the small-scale DVD authors to enrich their DVDs, at least with respect to the creation of customized menus, is significantly restricted. As a result, new techniques are required for recording and organizing DVDs by non-commercial and small-scale commercial authors, and in particular new techniques are required for customizing DVD menus without resort to sophisticated commercial hardware and software.

SUMMARY OF INVENTION

The principles of the present invention advantageously provide systems and methods allowing home and small commercial users to record digital versatile disks with customized menus. According to one particular embodiment, an embedded digital versatile disk recording system is disclosed which is operable to selectively record a menu with a user selected background image on a digital versatile disk.

Application of the principles of the present invention allow customized DVD menus to be created using either still images, full motion images, or both. These customized menus are useful for navigating the chapters or segments within an entire DVD or for navigating sub-segments within the individual chapters or segments themselves. The data utilized to create the customized menus is imported from any one of a range of different sources and in any one of a number of different formats. In sum, a home or small commercial author can add personal touches to DVD recordings using embedded recording subsystems within home DVD recording-playback subsystems.

BRIEF DESCRIPTION OF DRAWINGS

For a more complete understanding of the present invention, and the advantages thereof, reference is now made to the following descriptions taken in conjunction with the accompanying drawings, in which:

FIG. 3 is a diagram graphically illustrating the procedure described by the flow chart of FIG. 2.

DETAILED DESCRIPTION OF THE INVENTION

Figure 1:
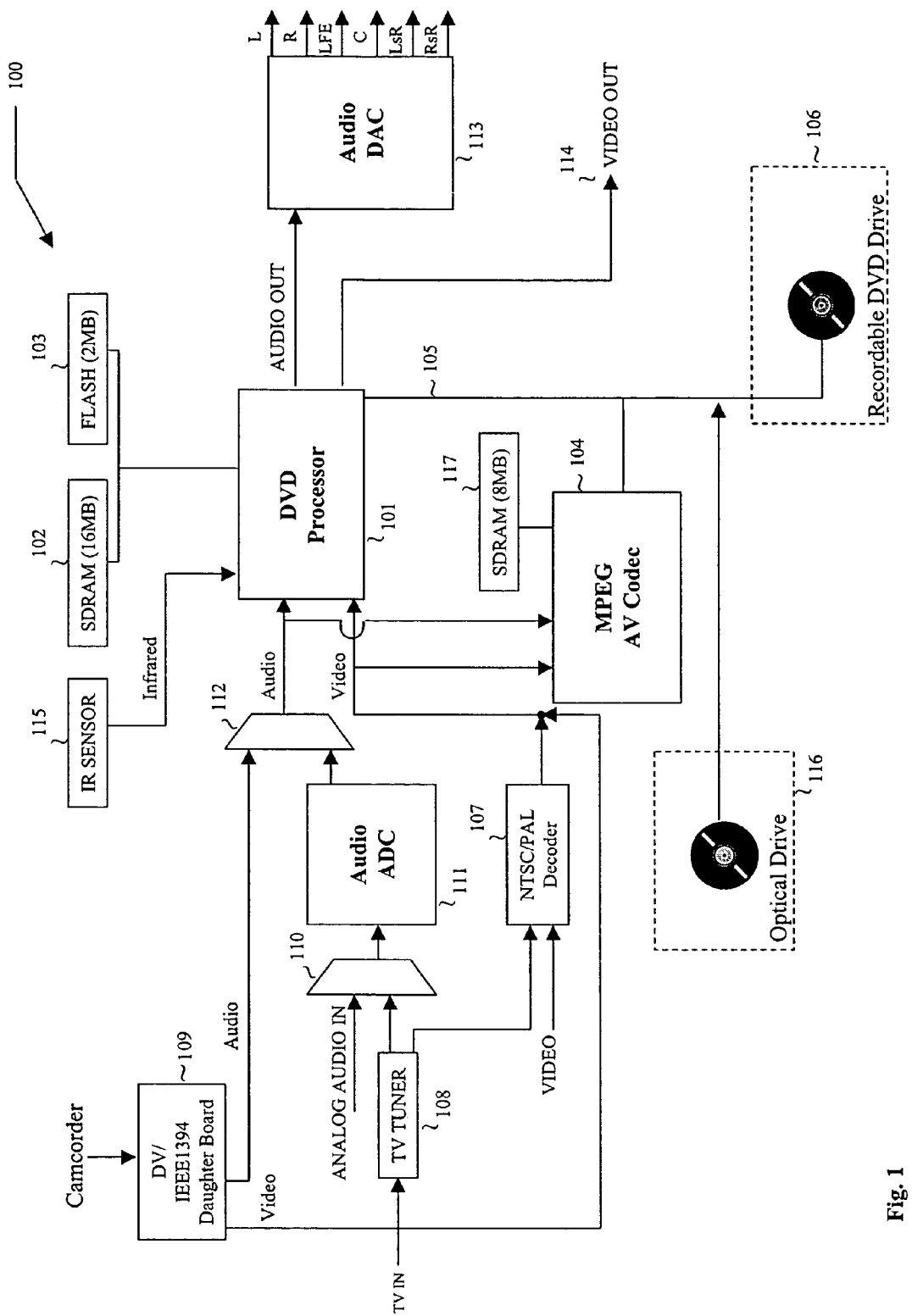
FIG. 1 is a high level block diagram of a digital versatile disk (DVD) playback-recorder system embodying the principles of the present invention.
Figure 2:
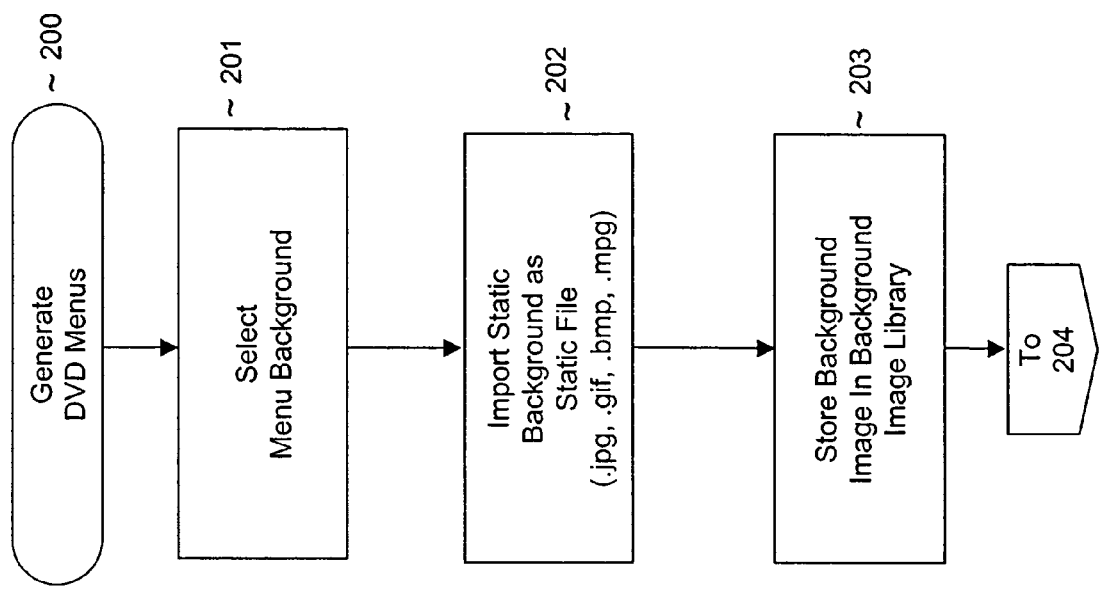
FIG. 2 is a flow chart of a procedure for generating DVD menus according to the principles of the present invention.
Figure 2:
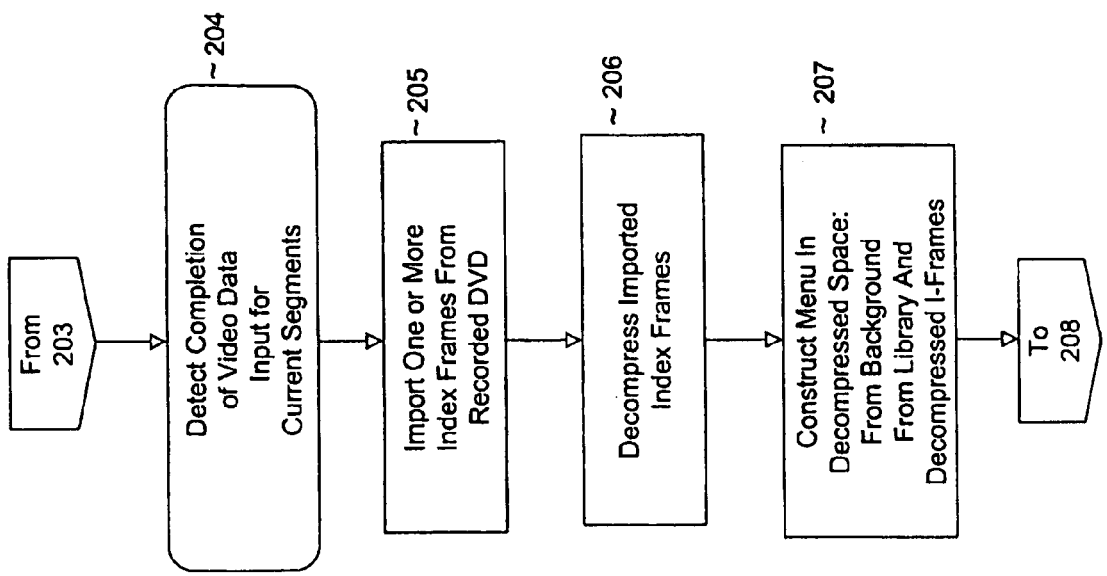
Figure 2:
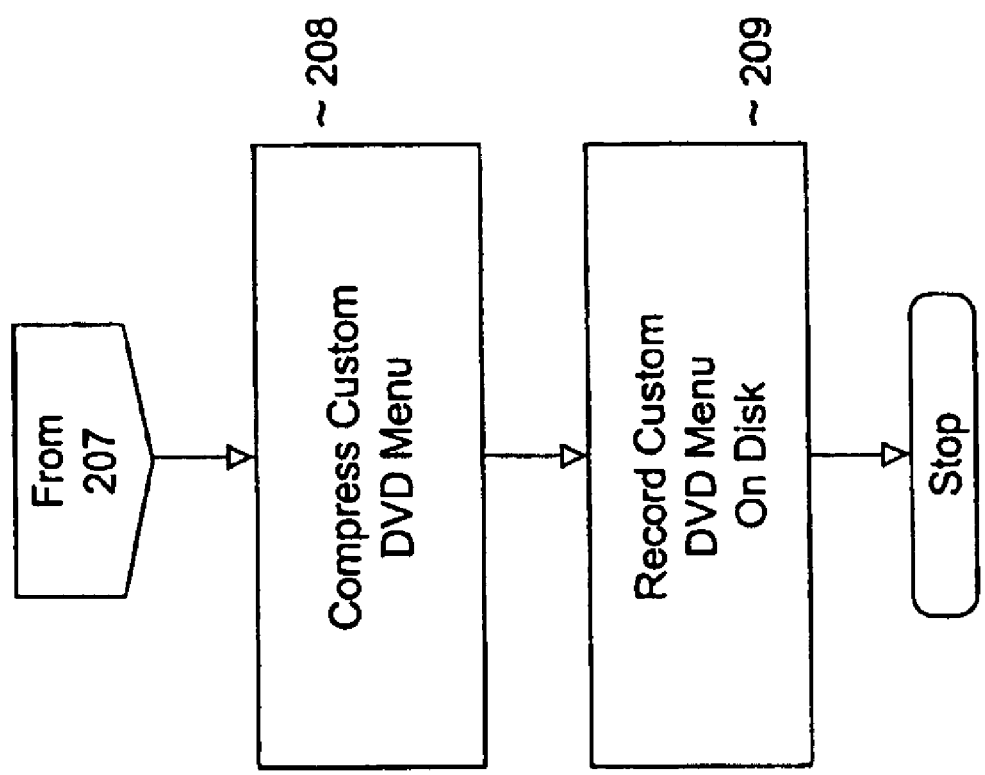

The principles of the present invention and their advantages are best understood by referring to the illustrated embodiment depicted in FIGS. 1-3 of the drawings, in which like numbers designate like parts.

FIG. 1 is a high-level block diagram of a digital versatile disk (DVD) playback-recorder system 100 with embedded menu generation capability embodying the principles of the present invention. Generally, DVD playback-recorder system 100 is a "stand alone" or dedicated DVD system, intended primarily for recording and playing back DVDs, instead of a general purpose computing system which also performs a range of other processing operations such as word processing and data manipulation.

DVD playback-recorder system 100 is based on a DVD (host) processor 101 operating in conjunction with a synchronous dynamic random access memory (SDRAM) subsystem 102 and a flash (non-volatile) memory subsystem 103. Generally, DVD processor 101 controls the overall operation of DVD playback-recorder system 100 and performs video encoding and decoding under selected Motion Picture Expert Group (MPEG) video encoding/decoding standards and audio decoding utilizing such audio algorithms as DTS, Dolby Digital, Windows Media Audio, MPEG audio, and DVD audio. In the illustrated embodiment, DVD processor 101 is based on the family of Cirrus Logic® CS 98200 DVD processors.

DVD playback-recorder system 100 also includes an MPEG audio-visual (AV) codec 104, which in the illustrated embodiment is based on a Cirrus Logic® CS98228 codec, preferably with the enhancements discussed below. MPEG codec 104 generally performs MPEG audio and video compression and decompression and data multiplexing and de-multiplexing. DVD processor 101 and MPEG AV codec 104 operate in combination via a bus 105, which in the illustrated embodiment is an IDE bus.

Bus 105 also supports a recordable DVD drive 106. As discussed further below, DVD drive 106 allows the playback of audio and video data from a conventional DVD, and the recording and playback of data to and from a DVD-R or DVD-R/W.

Television video inputs to DVD playback-recorder system 100 are made through an NTSC/PAL decoder 107. NTSC/PAL decoder 107 receives NTSC or PAL decoded data either from a TV tuner 108 through the TV IN port, or directly as composite or S-video formatted video data through the VIDEO input port. A digital video data stream output from NTSC/PAL decoder 107 is passed to DVD processor 101 and MPEG AV decoder 104 for encoding into the selected MPEG format. Video data can also be received from a camcorder through DV/IEEE 1394 daughter board 109.

Analog audio data are received from either TV tuner 108 or as a direct input to an analog audio input ANALOG AUDIO IN through multiplexer 110. Analog audio data from the selected audio source are converted to digital form by audio analog-to-digital converter (ADC) 111. Selection between digital audio input data from a camcorder through DVD/IEEE 1394 daughterboard 109 and data output of audio ADC 111 is performed by multiplexer 112. The digital audio stream selected by multiplexer 112 is passed to DVD processor 101 and MPEG decoder 104 for encoding into either an MPEG audio or Dolby Digital data format.

An internal or external optical drive 116 allows computer generated data, such as graphics background data, to be input to bus 105. Optical drive 116 is, for example, a conventional CD-ROM drive or even a second DVD drive.

Video output port 114 outputs either a composite video stream, an S-video stream, or a component progressive scan video stream. In the illustrated embodiment, six channels of audio output data are provided by an audio output digital to analog converter (DAC) 113 for home theater-type systems. An IR sensor 115 allows for the input of infrared control signals such as those generated by a hand-held remote control unit. Infrared sensor 115 also allows the user to input text from an external controller during the process of indexing recoded DVD titles and segments and menu creation.

DVD playback-recording system 100 allows users to record multiple segments and index those segments with buttons in a top level menu. Generally, a DVD recording includes three types of frames, namely, intra-frames (I-frames), forward predictive frames (P-frames), and bi-directional predictive frames (B-frames). The I-frames appear periodically within each segment and consist of entire frames of video data without reference to any other frame. The P-frames only reference preceding reference frames (i.e. preceding I- or P-frames), while the B-frames reference both preceding reference frames and subsequent reference frames. Sequences of I-, P-, and B-frames are utilized to compress the recorded video data by removing spatial redundancy within the same video frames and temporal redundancy between different video frames. Index frames, which are preferably I-frames taken from the corresponding video segment, represent the corresponding video segment and are selected by the DVD author in the procedure discussed below for generating buttons on the menu for quick jumps to that segment during playback.

Generally, the principles of the present invention allow the user of DVD player-recorder 100 to customize the menu background image against which the index frames are displayed as navigation buttons when authoring home and other small-scale production DVDs. Advantageously, the user of DVD playback-recording system 100 is able to select from a number of different image data sources, to produce the desired menu background image. In other words, DVD playback-recording system 100 allows the end user a wide range of options in authoring DVDs with the user's own personal touches.

FIG. 2 is a flow chart of a procedure 200 for generating DVD menus according to the principles of the present invention. In the present example, procedure 200 is being utilized to allow the user to selectively create a customized menu, which allows navigation of recorded segments on a DVD, as illustrated graphically in FIG. 3.

At Block 201, the user selects from available sources of static background data. For a still static background image, the desired data are imported at Block 202 from a selected medium in a conventional data format such as Joint Picture Experts Group or JPEG (.jpg), Graphic Interchange File (.gif), Moving Pictures Experts Group or MPEG (.mpg), or Bitmap (.bmp). In FIG. 3, the background image being imported is generally represented graphically at background image 301. Advantageously, the present inventive principles can utilize a number of different source media for importing static background data. Exemplary background data sources include a CD-ROM or a second DVD inserted in optical drive 116 of FIG. 1, user selectable or manufacturer-installed flash memory 103 with preset background schemes, a computer coupled to bus 105 for downloading procedurally generated graphics, or a computer or network appliance for downloading data to bus 105 from an external network, such as the Internet, World Wide Web, or local area network (LAN). Additionally, video frames copied into memory 102 from any video recorded on the current DVD in drive 106 of DVD playback-recording system 100 provide another source of static background image data.

Once the desired background data is imported into system 100 of FIG. 1, the data are stored at block 203, for example, in a menu background data library within the memory system 102. Advantageously, this menu background library can be updated by the user at anytime new background data is available or desired, thereby providing significant flexibility when the library is called upon during the DVD authoring procedures discussed further below.

At block 204, system 100 detects the completion of the recording of the current segment or segments onto the DVD disk inserted into DVD drive 106. Each segment includes a series of conventional I-frames, as discussed above, which include typically the first frame of the associated recorded segment. The I-frames on a DVD are compressed in the same format as the remaining data on the DVD. For each segment, an I-frame, typically the first I-frame in the segment, is selected by the end-user for as the index frame for menu button generation. Three index frames 302a-302c are shown in FIG. 3 for reference, in which a square, circle, and triangle are used to represent the actual content. This content is, for example, a scene from a recorded movie or television show, or a capture from an external digital camera. Preferably, the selected image provides a reminder or a pointer to the corresponding video segment being indexed. As more segments are recorded onto the DVD, more index frames are selected, as desired, to generate corresponding menu buttons.

The index frames from the recorded DVD are imported into memory system 102 of system 100 of FIG. 1, at block 205 of FIG. 2, and then decompressed at block 206. Subsequently, at block 207, the desired menu is constructed in decompressed video space generating buttons, for example, using the menu highlight layer, and menu background selected from the menu background library updated at Block 207. In DVD playback-recording system 100, menu composition is performed by DVD processor 101 in associated memory 102 of FIG. 1. The user also performs conventional image manipulation, such as scaling, blending, and insertion of text and graphics at Block 207. In particular, index frames 303a-302c of FIG. 3 normally must be compressed to fit within the confines of the ultimate menu frame space.

A graphical representation of one page of a custom composite menu, including the selected background and three buttons generated from three decompressed index frames, is shown in FIG. 3, generally at composite menu image 303. The number of buttons in a particular menu page will vary depending on the number of segments that have been recorded on the DVD, the overall size of the menu page, and the size of each button being generated. Further, the menu may also include multiple pages, each of which includes a given number of index frames 302a-302c. Multiple page menus are manipulated by stepping or scrolling by the user until the desired page is displayed.

At block 208, the composite menu generated at block 210 is compressed into compressed video form, such as in one of the MPEG formats, by MPEG codec 104. Then at Block 209, the compressed custom DVD menu is recorded on the DVD in recordable DVD drive 106 under the control of DVD processor 101.

If the user wishes to record additional video segments on the DVD, the steps performed at Blocks 204-209 of FIG. 2 are repeated to insert additional I-frames or menu pages to the custom DVD menu created above to update composite menu 303 of FIG. 3.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed:

1. A method of creating customized menus in an embedded digital versatile disk recording system comprising:
    selecting background data for generating a selected menu background;
    selectively converting at least one index frame comprising an intra-frame from a recorded digital versatile disk into decompressed video data;
    composing the selected menu in decompressed space from the selected background data and the decompressed video data, wherein the data for creating the background image is selected from the group of data formats consisting of Joint Picture Experts Group, Graphic Interchange File, or Bitmap data formats and is selectively extracted from one of a plurality of available sources, the plurality of available sources including the recorded digital versatile disk;
    compressing the composed menu; and
    recording the compressed composed menu onto the digital versatile disk.

2. The method of claim 1, wherein selecting background data comprises copying background data from the digital versatile disk.

3. The method of claim 1, wherein selecting background data comprises importing background data from a digital data source selected from the group consisting of optical disk drives, programmed flash memory devices, and computing appliances.

4. The method of claim 1, wherein selecting background data comprises selecting data for creating a still background image.

5. The method of claim 1, wherein composing the selected menu comprises composing a button for navigating to a segment on the digital versatile disk from the decompressed video data.

6. The method of claim 1, wherein composing the selected menu comprises composing a menu page having a background and a plurality of buttons composed of index frames representing each of a plurality of segments recorded on the digital versatile disk.

7. The method of claim 1, wherein selecting background data comprises selecting data available for download from a computer network.

8. A home digital versatile disk playback-recording system comprising:
    a digital versatile disk drive for recording and playing-back information on a digital versatile disk;
    a processing system for recording a menu with a selectable background image on the digital versatile disk; and
    a processor and an encoder-decoder operable to:
        import background image data from one of a plurality of available sources, the plurality of available sources including the digital versatile disk;
        selectively convert selected index frames, each index frame comprising an intra-frame, from the digital versatile disk into decompressed video data;
        compose the selected menu in decompressed space from the imported background image data and the decompressed video data;
        compress the composed menu; and
        record the compressed composed menu on the digital versatile disk.

9. The system of claim 8, further comprising a memory for storing a library of user-selectable background image data.

10. The system of claim 9, wherein the memory comprises a non-volatile memory storing a preset selection of user-selectable background image data.

11. The system of claim 8, further comprising a port for importing the background image data from an external source.

12. The system of claim 8, further comprising an embedded drive for importing the background image data.

* * * * *